United States Patent [19]

Sasayama et al.

[11] Patent Number: 4,756,592
[45] Date of Patent: Jul. 12, 1988

[54] LUMINESCENT PACKAGE DEVICE FOR COUPLING AN OPTICAL FIBER WITH A LUMINESCENT ELEMENT

[75] Inventors: Atsushi Sasayama; Tugio Nemoto, both of Komoro; Norihiro Yazaki, Takasaki, all of Japan

[73] Assignees: Hitachi, Ltd; Hitachi Eastern Semiconductor, both of Tokyo, Japan

[21] Appl. No.: 753,856

[22] Filed: Jul. 11, 1985

[30] Foreign Application Priority Data

Jul. 11, 1984 [JP] Japan .................. 59-142387

[51] Int. Cl.$^4$ .............................. G02B 6/42
[52] U.S. Cl. .................. 350/96.20; 350/96.18; 357/74
[58] Field of Search ............... 350/96.15, 96.16, 96.17, 350/96.18, 96.20; 250/227, 551; 357/74

[56] References Cited

U.S. PATENT DOCUMENTS

| 4,119,363 | 10/1978 | Camlibel et al. | 350/96.20 |
| 4,296,998 | 10/1981 | Dufft | 350/96.20 |
| 4,482,201 | 11/1984 | Dousset | 350/96.20 |
| 4,591,711 | 5/1986 | Taumberger | 250/227 |
| 4,702,556 | 10/1987 | Ishii et al. | 350/96.20 X |

FOREIGN PATENT DOCUMENTS

| 0067678 | 4/1984 | Japan | 350/96.20 |
| 1544241 | 4/1979 | United Kingdom |  |
| 2128768 | 5/1984 | United Kingdom | 350/96.20 |

OTHER PUBLICATIONS

Stecker und SpleiBe by Dr.-Ing. Oskar Krumpholz, Oct. 26, 1979, pp, 14-21, *Elektrotechnik* (1:20).

*Primary Examiner*—John Lee
*Attorney, Agent, or Firm*—Antonelli, Terry & Wands

[57] ABSTRACT

A luminescent device having a luminescent element, an optical fiber for taking up the light emitted from the luminescent element, and a package accommodating the illuminant element and receiving an end portion of the optical fiber. The optical fiber is fixed at a portion near the tip thereof by a first fixing material such that its optical coupling end opposes the light emitting region of the luminescent element, while the remainder part of the portion of the optical fiber in the package is surrounded and held by a second fixing material. By virtue of the second fixing, it is possible to avoid breakage or other defects of the fiber attributable to the difference in the thermal expansion coefficient between the core portion of the optical fiber made of quartz and a jacket of the optical fiber covering the core line portion, thus attaining a higher reliability of the illuminant device. The second fixing material also prevents water from coming into the package along the optical fiber, thereby ensuring a greater moisture-proof property of the device.

24 Claims, 3 Drawing Sheets

LUMINESCENT PACKAGE DEVICE FOR COUPLING AN OPTICAL FIBER WITH A LUMINESCENT ELEMENT

BACKGROUND OF THE INVENTION

The present invention relates to a luminescent device. Semiconductor lasers for use as a light source for optical communication systems or as a light source for information processing devices such as digital audio disks and video disks are shown in an article entitled "Technical Innovation in Semiconductor Laser" by Oka et al, pp. 25-29 of the publication "Semiconductor World", May, 1982.

The present applicant has already developed a communication laser module (semiconductor laser device) of the type shown, for example, in an article entitled "Semiconductor Lasers for Optical Communication Systems" by Hirao et al in "Hitachi Review" Vol. 1, 33 (1984) No. 4, pp. 193-198.

This semiconductor laser device is composed of a semiconductor laser element, an optical fiber which is fixed such that its end confronts the end surface (light emitting end surface) of the resonator of the semiconductor laser element, a light-receiving element for detecting the optical output of the laser beam emitted from the laser element (laser tip), and a hermetic package hermetically accommodating these elements and the optical fiber.

This semiconductor laser device functions satisfactorily as a semiconductor laser device for optical communication. However, the present inventors have found, through a study from the technical point of view, that this semiconductor laser device involves the following problems. It often happens that the portion of the optical fiber within the package is broken in a heat cycle test which is conducted after the assembly of device by subjecting the device to a repeated heat cycle of $-45°$ C. to $80°$ C. for the purpose of confirming reliability.

According to the result of the study made by the present inventors, the breaking of the optical fiber is attributable to the following reasons.

The optical fiber mentioned before is composed of:
(1) A core disposed at the center of the optical fiber and made of quartz and a clad layer (referred to also as "core line", hereinunder);
(2) Silicone resin coating the core and the clad layer; and
(3) A fiber jacket made of, for example, nylon and covering the silicone resin.

In the process for producing this optical fiber, the core and the clad layer made of quartz is coated with the resin which is soft. During this coating step, strain is caused in the core and the clad due to differences in the thermal expansion coefficients and hardness, so that a microscopic undulation is imparted to the central axis of the optical fiber.

When a semiconductor laser device employing this optical fiber is subjected to the heat cycle test, the central axis of the optical fiber tends to resume its original straight state so that the core wire projects from the fiber jacket so as to cause a deflection of the central axis within the package. It is assumed that the optical fiber has been broken when this deflection has increased to exceed a predetermined limit.

The study made by the present inventors has proved also that, in some cases, the fiber may be broken by as few as 10 heat cycles in the aforementioned temperature test.

The present invention is based upon the result of this study.

SUMMARY OF THE INVENTION

Accordingly, an object of the invention is to improve the reliability of semiconductor laser devices.

This object can be achieved by several embodiments disclosed in this specification, a typical one of which is outlined as follows.

Namely, in one aspect of the invention, an optical fiber is received in an optical fiber jacket guide provided in the peripheral wall of the package and is fixed suitably. Then, an epoxy resin is charged through a side wall of the jacket guide and is thermally set by application of heat, thus fixing the jacket portion and the core liner portion of the optical fiber. In this arrangement, the undesirable projection of the central axis of the optical fiber when subjected to cyclic heating and the consequent breakdown of the optical fiber are avoided advantageously, The resin also provides a sealing effect such as to prevent water from coming into the package along the optical fiber, thus improving the moisture-proofing of the semiconductor laser device.

DESCRIPTION OF THE PREFERRED EMBODIMENTS (Embodiment 1)

Figure 1:
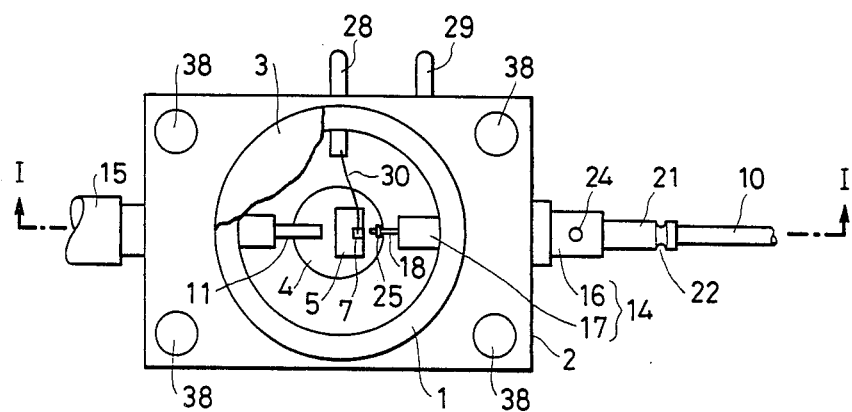
FIG. 1 is a partly cut-away top plan view of a semiconductor laser device incorporating an optical fiber, constructed in accordance with an embodiment of the invention.
Figure 2:
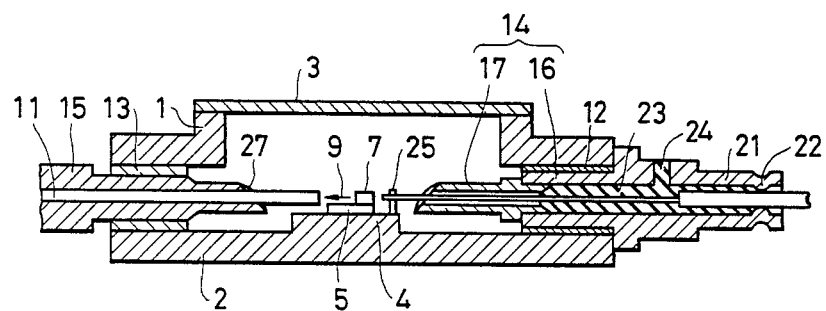
FIG. 2 is a sectional view taken along the line I—I of FIG. 1.
Figure 3:
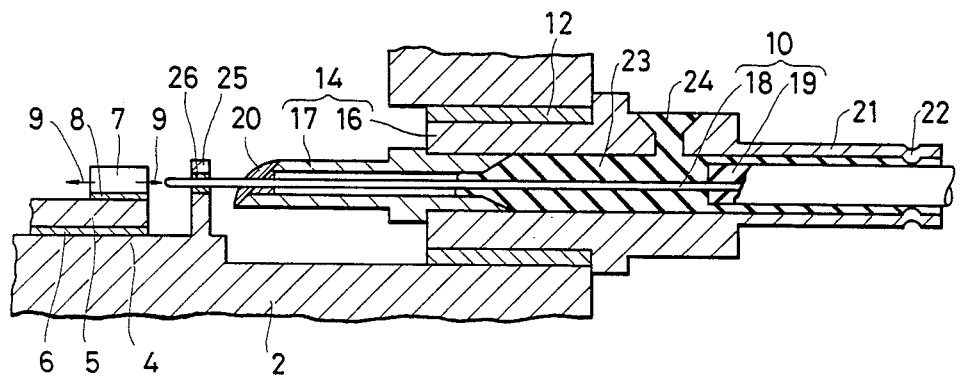
FIG. 3 is an enlarged sectional view of the semi-conductor laser device shown in FIG. 1, showing particularly the construction for fixing the optical fiber on a larger scale.

FIG. 1 is a partly cut-away top plan view of a semiconductor laser device incorporating an optical fiber, constructed in accordance with an embodiment of the invention, FIG. 2 is a sectional view taken along the line I—I of FIG. 1, and FIG. 3 is an enlarged sectional view of the semiconductor laser device shown in FIG. 1, showing particularly the construction for fixing the optical fiber on a larger scale.

As will be seen from FIGS. 1 and 2, a semiconductor laser device incorporating an optical fiber has a stem 2 made of a rectangular metallic plate provided on a major surface thereof with a ring-shaped sealing wall 1, and a metallic cap adapted to fit on the top of the ring-shaped sealing wall 1 of the stem 2 such as to hermetically seal the inside of the ring-shaped sealing wall 1. The major surface of the ring-shaped sealing wall 1 is further recessed deeply and is provided at its center with a pedestal 4. As will be seen from FIG. 3, a sub-mount 5 is fixed to the upper face of the pedestal 4 by means of a brazing material 6, and a laser chip 7 is fixed to this sub-mount 5 by means of a brazing material. The brazing material 6 and the brazing material 8 are shown in FIG. 3.

An optical fiber 10 and a monitor fiber 11, which are extended through the peripheral wall of the stem 2, have end surfaces opposing the light-emitting surfaces (mirror surfaces) of the laser, element in the laser chip 7. The optical fiber 10 and the monitor fiber 11 are guided by tubular fiber guides 14 and 15, respectively, which are extended through and fixed to the peripheral wall of the stem 2 by means of brazing materials 12 and 13. The guide 14 for guiding the optical fiber 10 has a stepped tubular jacket guide 16 directly fixed to the stem 2, and a flanged tubular fiber guide 17 concentrically fitting in the inner end of the jacket guide 16. Although not shown in the drawings, a suitable brazing material is used to join the jacket guide 16 and the fiber guide 17 in a hermetically sealed joint. The guide 14 receives an optical fiber 10 which is composed of a longitudinal core portion 18, hereafter referred to as the core, made of quartz coated with a metallized clad, and a jacket 19 made of a plastic such as nylon and covering the core portion 18. The jacket 19 on the end portion of the optical fiber in the guide 14 is removed so that the central axis portion 18 is exposed. The exposed central axis portion 18 is fixed to a fiber guide 17 by means of a fixing member 20 such as a plastic or solder attaching to the inner end portion of the fiber guide 17. The portion of the optical fiber 10 covered by the jacket 19 is fixed by a restricting portion 22 which is formed by caulking of a caulking portion 21 which constitutes a thin-walled exposed portion of the jacket guide 16. The exposed portion of the core line portion 18 extending through the tube of the guide 14 is surrounded and held by a resin 23 which is formed after the optical fiber 10 has been fixed by the fixing member 20 and by the caulking 22, first by being charged in the molten state through a charging port 24 having a longer diameter of, for example, 1 mm, provided in the jacket guide 16, followed by curing.

The end (inner end) of the core portion 18 of the optical fiber 10 is shaped conically and the end extremity is shaped into a spherical form so that the laser beam 9 emitted from the end surface of one of the resonators of the laser chip 7 is effectively picked up by the core (not shown). The end of the optical fiber 10 is received in a bore formed in a support 25 which is formed to project from the stem 2, and is fixed by means of a fixing member 26 (see FIG. 3) such as solder, in such a manner as not to move with respect to the laser chip 7. As stated before, a fixing member 20 such as a solder is charged in the gap between the optical fiber 10 and the fiber guide 17 such as to provide a hermetic seal, thereby preventing water from coming into the system 2 along the optical fiber.

The monitor fiber 11, which is also an optical fiber, is fixed to the guide 15 by a joint member 27.

In this semiconductor laser device, a laser beam is emitted from the end surface of the resonator of the laser chip 7 when a predetermined voltage is applied between the leads 28 (connected to the chip 7 by the wire 30) and 29 (connected to the metal stem 2), and is transmitted to any desired location through the optical fiber 10 serving as the transmission medium. The optical output of the laser beam 9 is continuously monitored by the monitor fiber 11 and control is effected so as to maintain a constant optical output.

The semiconductor laser device of the described embodiment is assembled by the following process.

As the first step, the guides 14 and 15 are fixed to the stem 2 and the monitor fiber 11 and the optical fiber 10 are secured through these guides 14 and 15. As stated before, the jacket 19 is stripped off the end portion of the optical fiber 10 received in the stem. The surface of the exposed core portion 18 is coated with a metallized surface and the tip of the optical fiber 10 is shaped substantially into a conical form. The optical fiber 10 is inserted into the guide 14 from the same side as the jacket guide 16 such that the end of the core line portion 18 projects slightly beyond the inner end of the guide 17 into the bore formed in the support 25. Then, the optical fiber 10 is fixed to the guide 14 by the restricted portion 22 which is formed as a result of caulking of the caulking cylinder 21. Subsequently, the core portion 18 of the optical fiber 10 is fixed to the tapered end portion of the fiber guide 17 by means of a fixing member 20.

Thereafter, a laser chip 7 is fixed to the pedestal 4 on the stem 2 through the intermediary of the submount 5 and a wire 30 is stretched over a predetermined portion. Thereafter, an adjustment is conducted such as to obtain an alignment between the axis of the laser beam 9 and the central axis of the core portion 18 and the fixing material 26 is charged into the hole formed in the fixing member. After the fixing material 26 has been set, an adjustment is made again to correct any misalignment of optical axes which may be caused during the setting of the fixing material.

Next, a resin 23 such as epoxy resin is injected through the charging port 24 of the above-mentioned jacket guide 16. An example of the composition of an epoxy resin that could be used would be one having an 18 weight percent base resin, 70 weight percent filler and 10 weight percent hardener. The base resin and the hardener should preferably both be of a liquid type with a glass transition temperature of around 100° C. (noting that standard resin used for resin plastic packaging often has a glass transition temperature of around 150° C., so that the resin utilized in this example has the advantage of being able to be cured at a lower temperature than normal). With the resin noted above, the hardener and base resin, in liquid form, can be mixed and left to stand at room temperature for several hours (e.g. 3 hours) to increase the viscosity to some extent and to release air contained in the mixed resin. Then, the mixed resin (which is still in liquid form) can be poured through the hole 24 around the core. Once this is done, heat treatment between 50° C.–100° C. (for example, at 90° C.) can be applied for about 2 hours to harden the liquid resin mixture (noting that thermal stability of the resin coating of the fiber is about 100° C.).

Consequently, the portion of the core 18 which has extended through the space in the guide 14 is surrounded and held by the resin 23.

Since the core portion 18 is surrounded and held by the resin 23, it exhibits great mechanical strength. Since it is difficult to initially hold the fragile longitudinal core portion 18 during mounting of the optical fiber 10 on the package constituted by the stem 2 and the cap 3, the portion of the optical fiber 10 coated by the jacket 19 is initally fixed by caulking to the guide 14 and, thereafter, the core line portion 18 is fixed to the guide 14, particularly to the fiber guide portion 17, by means of the fixing material 20.

If the optical fiber is held in this state, since the jacket 19, made of a plastic such as nylon, has a thermal expansion coefficient greatly different from that of the core line portion 18 made of, for example, quartz, thermal stress is generated between the fixed end portions of the core line portion 18 as a result of the repeated heat cycle, thereby bending that portion of the core portion 18. In consequence, the core portion 18 is progressively projected from the fiber jacket 19 so that, when the degree of bending is great, the core portion is broken thereby becoming unusable as an optical transmission medium.

In the described embodiment, however, since the core portion 18 is surrounded and held by the resin 23, no bending of the core portion 18 takes place, thus eliminating the undesirable breaking of the said core portion 18, whereby the failure of the optical fiber, which would be a critical defect in the device, can be avoided advantageously.

The resin also is effective in preventing water from coming into the device along the fiber jacket, thus improving the moisture proof property of the device.

As will be seen from FIG. 3, the resin 23 does not perfectly fill the space between the core line portion 18 of the optical fiber and the fiber jacket 19 for the following reasons. Namely, the complete filling of this space with the resin 23 requires an increase of the resin charging pressure and other suitable measures, and there is a risk of causing strain in the fiber, as well as other detrimental effects, due to the high charging pressure and the pressure generated during the setting of the resin.

Finally, the cap 3 is welded hermetically to the ring-shaped sealing wall 1 of the stem 2, thus completing the semiconductor laser device with its optical fiber. The stem 2 is provided with mounting holes 38 at its four corners, said holes being used when the device is mounted in a working system.

(Embodiment 2)

The space in the portion of the guide 14 between the portion 20 where the core 18 is fixed and the restricted portion 22 of the caulking cylinder 21 for fixing the jacket 19 formed around the core 18 may be filled with the resin 23 in a manner which will be explained hereinunder.

Figure 4:
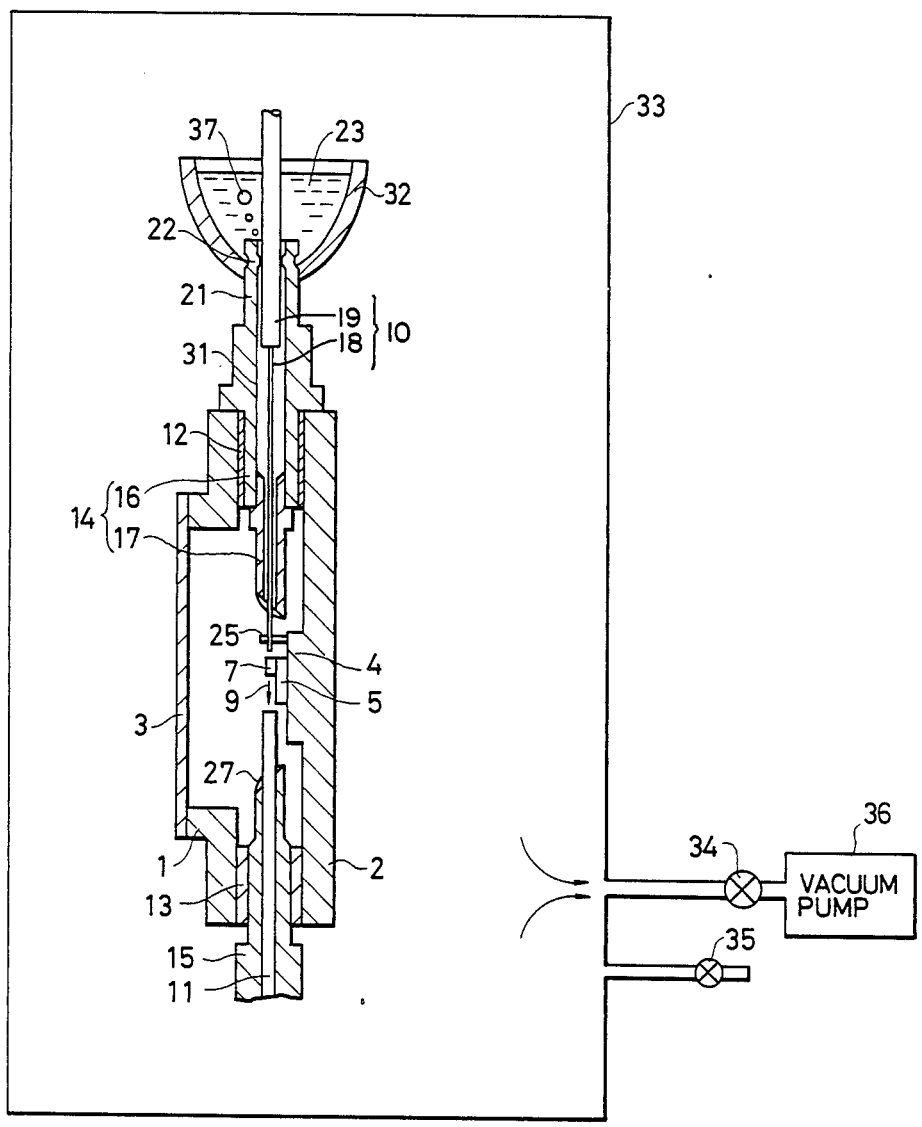
FIG. 4 is an illustration of the concept of a resin-filling operation of the invention.

As shown in FIG. 4, a funnel 32 made of rubber is attached to the end of the caulking tube 21, and resin of an amount sufficient to fill the space 31 is charged into the funnel, while the semiconductor laser device is vertically held within a vacuum system 33. An epoxy resin similar to that described in Embodiment 1 can be used, if desired, with the mixed resin still being in liquid form when it is poured into the funnel.

In this state, the resin 23 does not come into the space 31 because there still is air in this space. The vacuum system 33 is connected to a vacuum pump 36 such as a rotary pump through a valve 34, and is connected also to the atmosphere through a leak valve 35. After closing the leak valve, the vacuum pump 36 is started to evacuate the interior of the vacuum system 33 to a vacuum of 1 Torr to $10^{-2}$ Torr. Since the restricted portion 22 of the caulking tube 21 does not provide a perfect hermetic seal, air in the space 31 escapes through the restricted portion and is released as bubbles through the resin 23, because the pressure around the semiconductor laser device has been reduced to allow the air in the space 31 to expand and to be released to the outside of the device into the space around the semiconductor laser device within the vacuum system 33. This operation is continued until the pressure of the air in the space 31 comes down to a predetermined level and, thereafter, the valve 34 is closed. Then, in order to fill the whole portion of the space 31 with the resin 23, the leak valve 35 is opened to recover the atmospheric pressure (760 Torr) within the vacuum system. Consequently, the resin 23 is sucked in so as to fill the whole portion of the space 31. Although the pressure in the vacuum system 33 is almost the same (1 to $10^{-2}$ Torr) as that in the space 31 before the leak valve 35 was opened, the pressure in the vacuum system 33 is gradually increased to ambient atmospheric pressure (760 Torr) as the leak valve is opened, so that a pressure differential is produced to cause the resin 23 in the funnel 32 to come into the space 31 through the restricted portion 22. Then, after detaching the funnel 32, the semiconductor device is subjected to a heat treatment at 50° to 100° C. so that the resin 23 is thermally set.

Figure 5:
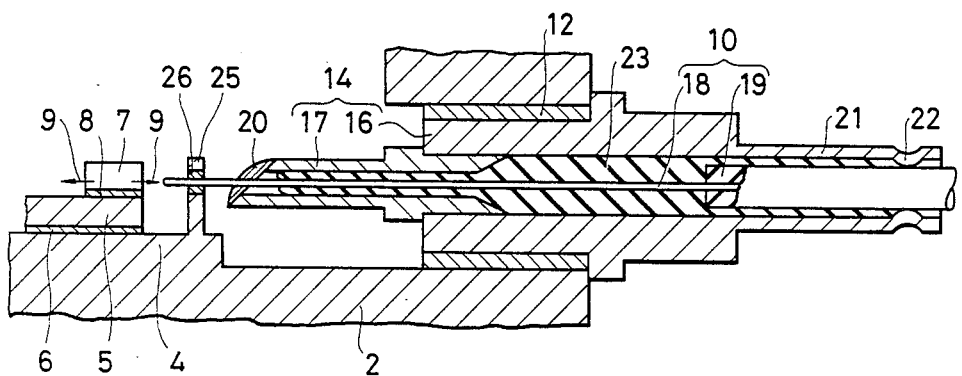
FIG. 5 is an enlarged sectional view of the construction for fixing the optical fiber.

FIG. 5 is a sectional view of an essential portion of a semiconductor laser device constructed in accordance with this embodiment, in which the same reference numerals are used to denote the same parts or members as those in the first embodiment. It will be seen that the moisture-proof property and the mechanical strength are improved by the resin filling the space between the fiber guide and the optical fiber.

Note that the semiconductor laser device produced by the described method does not have any specific port for charging the resin 23. Thus, this embodiment differs from the first embodiment wherein a port 24 is formed in the jacket guide 16. In the second embodiment described hereinbefore, the resin 23 can be safely charged into the space between the fiber guide and the optical fiber, without requiring any charging port 24 in the jacket guide 16. The elimination of the resin charging port contributes to an improvement in the working efficiency and reliability.

In addition, the production system can be operated and maintained easily because it simply makes use of a vacuum pump such as a rotary pump, and the production system can be laid-out in a factory very easily because it occupies relatively little space.

In the illustrated case, the funnel 32 made of rubber is fixed to the wall of the caulking tube 21. The invention, however, is not limited to this configuration and the same result is obtained also when the funnel 32 of rubber is formed as a unit with the end of the caulking tube 21 from the beginning.

(Advantages)

1. In the semiconductor laser device of the invention, an optical fiber 10 is secured by means of the guide 14 to the package which is composed of the stem 2 and the cap 3. In the assembled state, the core portion 18 of the optical fiber extending through the hollow of the guide 14 is surrounded and held by the resin 23. Since the core portion 18 is firmly held by the resin 23, the undesirable bending of the core portion 18 is prevented even when the thermal stress due to a difference in the thermal expansion coefficient between the plastics and quartz is applied to the core wire portion 18, so that problems such as breakage of the core line portion 18 are avoided. Thus, the mechanical strength in the structure for fixing the optical fiber 10 and, hence, the reliability of the semiconductor laser device are advantageously improved.

2. In the semiconductor laser device of the invention, the exposed core portion 18 of the optical fiber 10 in the portion where the fiber is fixed is protected by the resin 23 against corrosion due to moisture and gases contained by the ambient air. In addition, any deterioration of the elements including the laser element in the device due to water which may otherwise come into the device along the optical fiber jacket is prevented advantageously, so that the reliability of the device can also be improved in this respect.

3. The optical fiber 10 is fixed over its entire portion by the caulking on the jacket 19, by the fixing material 20 on the core 18 and by the resin 23 on the core 18, so that the undesirable axial displacement of the optical fiber 10 due to temperature change is suppressed to avoid any change in the efficiency of coupling or optical axis alignment between the laser chip 7 and the optical fiber 10, thus attaining a high quality of the semiconductor laser device.

4. By the combination of the advantageous features 1 to 3 stated above, the present invention provides a reliable, high quality semiconductor laser device.

Although the invention has been described through specific embodiments, it is not limited to the described embodiments; various changes and modifications may be imparted thereto without departing from the spirit or scope of the invention. For instance, although the described embodiments of the semiconductor laser device employs a monitor fiber, the same result is obtained when the semiconductor laser device incorporates a light-receiving element. Also, although the resin 23 discussed above has been primarily described as being an epoxy resin having a particular weight percentage composition, it is to be understood that other epoxy resins or, indeed, other types of resins could be used. For example, phenol resins could also be effective for use with the present invention, particularly because their extreme hardness would help avoid breakage of the fiber. Regarding the resin, it is noted that it is preferred to use resin in a liquid form rather than in a powdered form since placing powdered resin through the small filler hole 24 of the first embodiment or having it pass around the region 22 in the second embodiment would be quite difficult. Also, powdered resin generally requires a very high heat treatment for melting and hardening.

The resin 23 may fill the entire volume of the space in the fiber guide, but filling such space completely requires careful planning in order to avoid the detrimental effect of partial filling explained before.

(Industrial Applicability)

The described embodiments of the invention are applied to optical communication systems making use of a semiconductor laser which belongs to a field constituting a background of the invention. The invention is not limited to these embodiments; it can be applied equally effectively to production of various illuminant devices which have a combination of an optical fiber and, in place of the semiconductor laser, a chip of a light-emitting diode, an integrated optical device (OEIC) having a semiconductor laser, or a light-receiving element.

Thus, the invention can be applied at least to optoelectronic devices incorporating an optical fiber.

We claim:

1. A luminescent device comprising:
 a luminescent element having a light emitting region for emitting light;
 a package accommodating said luminescent element and having an opening formed therein; and
 an optical fiber having a first end which is inserted into said package through said opening, wherein
 said optical fiber has a core portion constituting a passage for transmitting said light and a jacket covering said core portion;
 said jacket terminating within said opening without reaching said first end of said optical fiber received in said package such as to expose the extremity of said core portion at said first end of said optical fiber;
 the portion of the exposed core portion spaced from but near the extremity thereof being located within said opening and fixed therein by a first fixing material within said opening such that said extremity of said core portion opposes said light emitting region of said luminescent element but is not fixed by said first fixing material; and
 the part of said exposed core portion near where said jacket terminates and the part of said jacket near where said jacket terminates being covered and fixed relative to said opening by a second fixing material within said opening, said second fixing material being formed after the portion of the exposed core portion near the extremity thereof has been fixed by the first fixing material.

2. A luminescent device according to claim 1, wherein said luminescent element is a semiconductor laser element, and wherein said first fixing material and said second fixing material are a resin.

3. A luminescent device according to claim 2, wherein said resin is an epoxy resin.

4. A luminescent device according to claim 1, further comprising:
 a supporting member having a hole, wherein the part of said extremity of said exposed core portion within said package extends through said hole so that said extremity of said core portion opposes said light emitting region of said luminescent element; and
 a third fixing material charged into said hole so as to fix said part of said extremity of said exposed core portion within said package.

5. A luminescewnt device according to claim 4, wherein said third fixing material is a metal.

6. A luminescent device according to claim 1, wherein the extremity of the exposed core portion has a conical configuration.

7. A luminescent device comprising:
 a luminescent element having a light emitting region for emitting light;
 a package accommodating said luminescent element and constituted by (a) a stem on which the luminescent element is mounted, (b) a ring-shaped sealing wall formed on the stem to surround the luminescent element, (c) a cap formed on said sealing wall over said luminescent element, and (d) a guide extending through said sealing wall; and
 an optical fiber having (a) a core portion constituting a passage for transmitting light, and (b) a jacket covering said core portion and having an inner end;
 said optical fiber being extended and fixed in said guide,
 wherein said jacket of said optical fiber terminates within said guide without reaching said inner end of said optical fiber in said package to thereby expose the end extremity of said core portion at said inner end of said optical fiber, so that said inner end of said optical fiber has an exposed core portion, a first part of the exposed core portion spaced from but near the end extremity being fixed to said guide by a first fixing material such that the end extremity is not fixed by said first fixing material, while a remaining part of the exposed core portion within said guide and said jacket within said guide are fixed to said guide by a second fixing material, said second fixing material being formed to fix said remaining part of the exposed core portion to said guide after said first part of the exposed portion has been fixed to the guide by said first fixing material.

8. A luminescent device according to claim 7, wherein said first fixing material is a metal, and said second fixing material is a resin.

9. A luminecent device according to claim 8, wherein said exposed core portion has a metal layer formed at a surface thereof. wherein said jacket of said optical fiber is fixed to said guide by means of a restricted portion of said guide.

10. A luminecent device according to claim 7, wherein the inner end of said opticla fiber projects from said guide to oppose said light emitting region of said luminescent element, and wherein a part of said inner end of said optical fiber near the end extremity of said core is fixed by a third fixing material.

11. A luminescent device according to claim 7, wherein a wall of said guide is provided with a charging port for charging a resin constituting said second fixing material into the space in said guide through which said core portion extends.

12. A luminescent device according to claim 7, wherein said jacket of said optical fiber is fixed to said guide by means of a restricted portion of said guide.

13. A luminescent device according to claim 7, wherein said luminescent element is a semiconductor laser element.

14. A luminescent device according to claim 7, wherein said jacket of said optical fiber is also fixed in said guide by said second fixing material.

15. A luminescent device according to claim 7, wherein the inner end of said optical fiber has a conical configuration.

16. A light emitting device comprising:
(a) a light emitting element for emitting light;
(b) a package having said light emitting element secured therein and having an opening formed therein;
(c) an optical fiber including a core portion for transmitting said light emitted from said light emitting element and a jacket covering said core portion, said optical fiber further having a first end and a jacket terminating portion, wherein an exposed core portion extends between said first end and said jacket terminating portion;
(d) a tube guide for guiding said optical fiber, said tube guide extending through said opening and fixed to said package, wherein said opitcal fiber extends through said tube guide and further wherein said first end of said optical fiber is located within said package and said jacket terminating portion is located within said tube guide; and
(e) fixing means for fixing both said jacket and said exposed core portion in said tube guide without fixing an extremity of said first end with said fixing means.

17. A light emitting device according to claim 16, wherein said jacket and said exposed core portion are fixed within said tube guide without a space existing between said jacket terminating portion and the exposed core portion near said jacket terminating portion.

18. A light emitting device according to claim 16, wherein said light emitting element is a semiconductor laser diode.

19. A light emitting device according to claim 16, wherein said core portion is comprised of quartz and said jacket is comprised of nylon.

20. A light emitting device according to claim 16, wherein said fixing means includes a resin.

21. A light emitting device according to claim 16, wherein said tube guide includes a charging part being charged with said fixing means into said tube guide.

22. A light emitting device according to claim 16, wherein said core portion is disposed substantially at the center of said optical fiber.

23. A light emitting device according to claim 16, wherein said first end of said optical fiber has a conical configuration.

24. A semiconductor laser device comprising:
(a) a semiconductor laser element for emitting a laser beam;
(b) a package including said semiconductor laser element secured therein and having an opening formed therein;
(c) an optical fiber including a core portion for transmitting the laser beam emitted from said semiconductor laser element and a jacket for covering said core portion, said optical fiber further including a first end, a jacket terminating portion and an exposed core portion extending between said first end and said jacket terminating portion, and wherein an extremity of said exposed core portion has a conical configuration so that the laser beam emitted from said semiconductor laser is effectively picked up by said core portion;
(d) a tube guide for guiding said optical fiber, said tube guide extending through said opening and fixed to said package, wherein said optical fiber extends through said tube guide and further wherein said exposed core portion and said jacket terminating portion are located within said tube guide; and
(e) fixing means for fixing both said jacket and said exposed core portion in said tube guide such that the extremity of said exposed core portion is not fixed with said fixing means.

* * * * *